Sept. 23, 1947.  P. D. MERRILL  2,427,994
PIPE FITTING
Filed Nov. 5, 1943
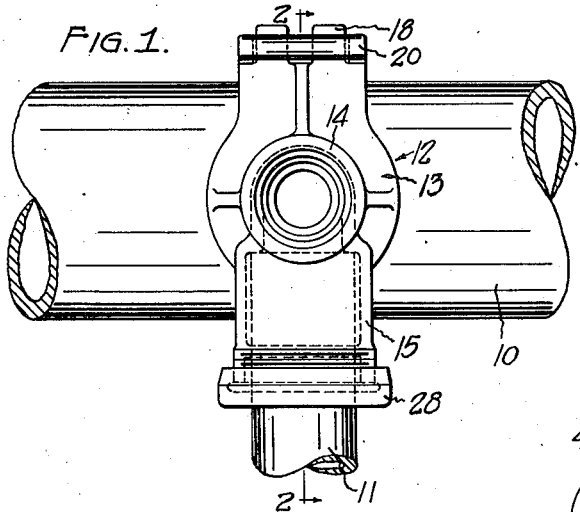
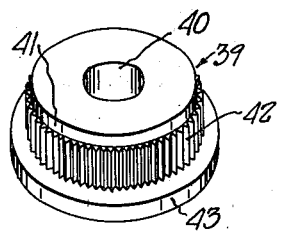
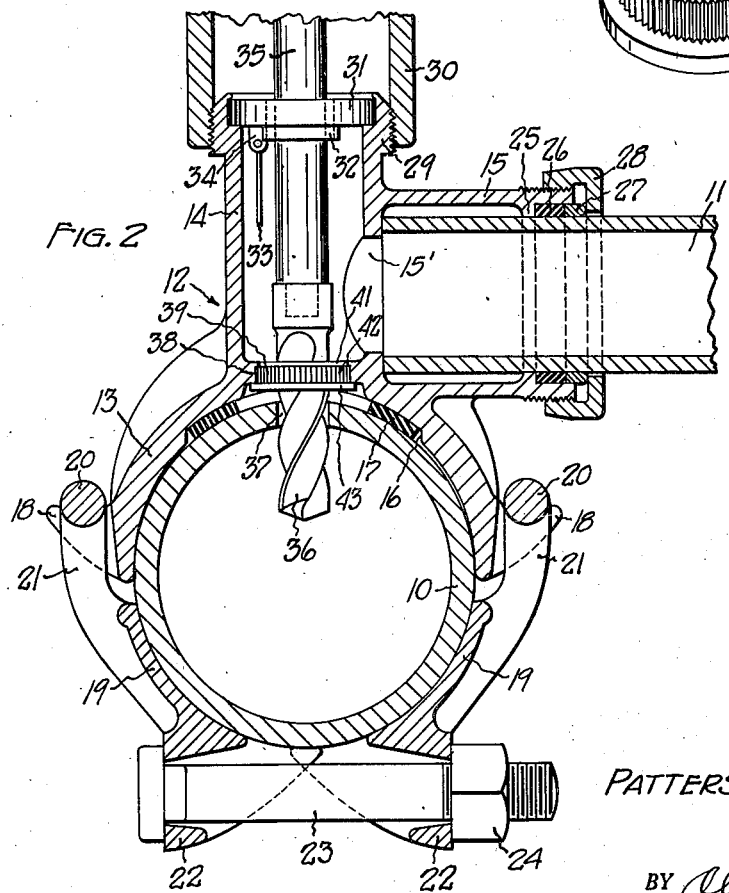
PATTERSON D. MERRILL.
INVENTOR.
BY Oltsch & Knoblock
Attorneys.

Patented Sept. 23, 1947

2,427,994

UNITED STATES PATENT OFFICE 2,427,994

PIPE FITTING

Patterson D. Merrill, South Bend, Ind., assignor to M. B. Skinner Company, South Bend, Ind., a corporation of Indiana Application November 5, 1943, Serial No. 509,095

2 Claims. (Cl. 77—62)

1

This invention relates to improvements in branch pipe fittings used to connect a branch pipe to a main to establish a service connection. More particularly, the invention relates to fittings of the type with which drilling means are adapted to be connected for the purpose of tapping or drilling the main to establish communication between the main and the branch.

The operation of drilling to form an opening in a pipe, by means of drilling apparatus mounted upon a fitting, entails the use of a comparatively long shaft which mounts a drill and extends from the drilling apparatus and through the fitting to engage the pipe. The length of this unit, the inaccessibility thereof within the apparatus and the fitting, and the action of the drill upon a convex pipe surface, all tend to make the drilling operation difficult. This is especially true in cases where the cutting element is an annular cutter which has no centering point to steady the elongated unit during the first part of the cutting or drilling operation. Provision of drill steadying or guiding means within the fitting, as illustrated in my copending application, Ser. No. 393,541, filed May 15, 1941, solves this problem, but introduces other problems. Thus, it is desirable to manufacture a fitting of given size which is usable on pipe lines without regard to the pressure therein. In other words, a given fitting should be applicable on pipe lines of low, intermediate and high pressures. The pressure in the line determines the size of the opening formed in the main to establish communication with the connected branch through the fitting. Therefore, preformed drill guides must either be constructed to be drilled away to provide a guide of proper size before the pipe can be drilled, or a selection of fittings with many different sizes of such drill guides must be available.

In the instant invention these problems are solved by fabricating a standard construction of pipe fitting for a given pipe size which includes a guide-receiving seat of standard size, and providing therewith a set of drill guides having standard outer dimensions and guide passages of different sizes. Thus the fitting can be conditioned or prepared on the job with a drill guide of desired size by simply selecting a drill guide element having a drill guide passage of proper size, and inserting it in the pipe fitting prior to application of the fitting to the pipes.

Therefore, the primary object of the invention is to provide a guide element having a guide passage of selected size which may be inserted accurately easily and quickly in a receiving seat

2 of a pipe fitting in which a pipe-drilling apparatus is operable and in a position adjacent the pipe.

A further object is to provide a drill guide element having an accurate self-centering and self-aligning drive-fit in a seat provided therefor in a pipe fitting.

A further object is to provide a drill guide element adapted to be mounted in a seat of a pipe fitting, with a drive fit, which has a lead portion fitting snugly and slidably in said seat to guide the entrance of said element in said seat, and a locking portion having a tight driven fit in said seat.

Other objects will be apparent from the description and appended claims.

In the drawings:

Fig. 1 is a top plan view of a fitting.

Fig. 2 is a vertical sectional view taken on line 2—2 of Fig. 1.

Fig. 3 is a perspective view of one form of drill guide element.

Referring to the drawing, which illustrates the preferred embodiment of the invention, the numeral 10 designates a pipe main with which a branch pipe 11 is to be connected by means of a pipe fitting 12, here illustrated as a saddle coupling.

Pipe fitting 12 comprises an arcuate or concavo-convex saddle plate 13 from the center of whose convex side projects an integral drill tube 14, and a branch connector 15 projects laterally from and is formed integrally with tube 14 and communicates therewith at opening 15'. Saddle plate 13 preferably has a shallow central recess 16 in its inner face adapted to receive an annular pipe-engaging gasket 17 substantially concentric with tube 14. Hooks 18 may be formed at the opposite ends of the saddle plate. A pair of similar draw parts each including an arcuate plate portion 19, a transverse pintle portion 20 at one end of the plate carried by spaced arms 21 providing apertures therebetween to receive the hooks 18, and an apertured ear 22 at the other end of the plate, are hooked on hook portions 18. A draw bolt 23 extends through the apertured ears 22 and mounts a nut 24 by means of which the fitting parts can be drawn tightly about the main 10 to effect a fluid-tight seal of gasket 17 with the main.

The branch connector tube 15 is preferably provided with a compression fitting for effecting a sealed connection with branch pipe 11. As illustrated, branch pipe 11 fits within tube 15, which has an internal annular shoulder 25 intermediate its ends for centering the pipe therein. A gasket ring 26 encircles the pipe 11 within the outer end portion of tube 15 and bears against shoulder 25. A follower ring 27 encircles the pipe 11 and bears against the outer face of gasket 26. A gland nut 28 is threaded on the end of tube 15 and urges the follower 27 inwardly to compress the gasket 26 and thereby provide a sealed joint between the tube 15 and pipe 11.

Drill tube 14 extends above connector tube 15, and is provided with an enlarged externally screw threaded end portion 29 upon which the tubular adapter portion 30, of a conventional drilling apparatus (not shown) is solidly mounted. An internal shoulder is formed within tube 14 by an enlarged end bore portion to receive an annular valve body member 31 locked in place by crimping the projecting end of the tube 14 thereover. Valve body 31 has a reduced diameter depending neck portion 32 against which a valve plate 33 pivoted to depending ears 34 is adapted to seat. The shaft 35 of the drilling apparatus extends therefrom and into tube 14 through annular member 31, and is adapted to detachably mount a drill or cutter 36 on the end thereof. These parts are so constructed and arranged as to permit the drill or cutter to be operated and fed axially of tube 14 to cut the opening 37 in the pipe 10 after the fitting 12 has been operatively connected to pipes 10 and 11; and then to be withdrawn, whereupon the pressure within tube 14 shifts valve plate 33 into operative sealing engagement with the end of collar or sleeve 32 and holds the same in sealing position while the drilling apparatus is removed and a sealing cap (not shown) is applied to the threaded end of tube 14.

The lower end of the tube 14, preferably adjacent the juncture thereof with saddle plate 13 and below the juncture of connector tube 15 therewith, has an internal annular rib 38 formed integrally therewith. This rib is preferably narrow, whereby the inner diameter thereof is only slightly less than the inner diameter of tube 14. This rib forms a seat for receiving a drill guide member. It will be understood, however, that this seat need not be of reduced size as illustrated, but may comprise the lower portion of the tube per se. Within this seat is mounted an annular drill guide member 39 having a central passage 40 therethrough of proper size to guide the drill or cutter and restrain the same against vibration and chatter.

The preferred embodiment of the drill guide member 39 is illustrated in Fig. 3. The upper or leading end portion 41 of member 39 is of a diameter to fit snugly within the seat, thereby insuring proper location and alignment thereof in the seat when the operation of inserting said member is started. The intermediate portion of the outer surface of member 39 is longitudinally ribbed or knurled at 42, with the knurls or ribs having sharp edges, and the diameter at the apices thereof slightly greater than the diameter of the seat. Consequently, after the leading portion 41 of member 39 has been inserted properly in the seat, the drill guide member can be hammered or otherwise driven to operative position with the ribs or knurls cutting into the seat to provide a firm anchorage or interlock with the fitting. The fitting is preferably formed of malleable iron, which will accommodate such hammering and interlock cutting. A large diameter stop 43 is formed at the end of the member opposite the lead portion, and is adapted to bear against the lower face of the rib 38. A plurality of guide members 39 may be provided in sets, each having a passage 40 of a different diameter corresponding to the dimensions of a standard cutter or drill. The length of the guide members need not be great, since the principal function thereof is to engage or guide and to confine or restrain the drill at a point adjacent the pipe and thus prevent vibration and chatter and the possibility of breakage resulting therefrom. The primary restriction upon the length of the guide member is that it must not project inwardly enough to interfere with a solid sealing fit of the gasket upon pipe 10, nor project outwardly to an extent closing off any substantial portion of opening 15'.

I claim:

1. A drill guide member adapted for insertion in an internal annular seat of the drill tube of a pipe fitting adapted to connect a branch pipe to a main, the outer end of said seat being defined by a transverse shoulder uniformly disposed relative to the axis of the seat, comprising an annular body member having a smooth inner cylindrical wall, the outer peripheral surface of said body including a smooth cylindrical portion of a size fitting snugly in said seat and extending for a portion of the length of said body, a concentric portion having sharp edged longitudinal ribs projecting radially outwardly relative to the diameter of said cylindrical portion, and adapted to cut into said annular seat, and an enlarged stop on said member defining a shoulder complementary to and adapted for face engagement with the transverse end shoulder of said seat to accurately position and axially align said guide member in said tube.

2. A drill guide member adapted for insertion in a reduced diameter bore of an internal seat of the drill tube of a pipe fitting adapted to connect a branch pipe to a main, said fitting having a flat surface perpendicular to the axis of the bore of said seat to define the outer end of said seat, comprising an annular body member having a smooth cylindrical exterior surface portion at one end of a diameter to fit snugly in said seat bore, an intermediate exterior surface portion defined by sharp longitudinal seat-cutting ribs and of an over-all diameter slightly greater than the size of said seat bore, and an enlarged shoulder portion at its opposite end having a transverse plane inner surface bearing flat against the flat end surface of said seat.

PATTERSON D. MERRILL.

REFERENCES CITED

The following references are of record in the file of this patent:

UNITED STATES PATENTS

| Number | Name | Date |
|---|---|---|
| 596,708 | Houldsworth | Jan. 4, 1898 |
| 820,965 | Froggatt, Jr. | May 22, 1906 |
| 1,032,933 | O'Brien | July 16, 1912 |
| 2,017,154 | Larkin | Oct. 15, 1935 |
| 2,299,814 | Gale et al. | Oct. 27, 1942 |

FOREIGN PATENTS

| Number | Country | Date |
|---|---|---|
| 616,904 | France | Nov. 6, 1926 |